Figures 1, 2:
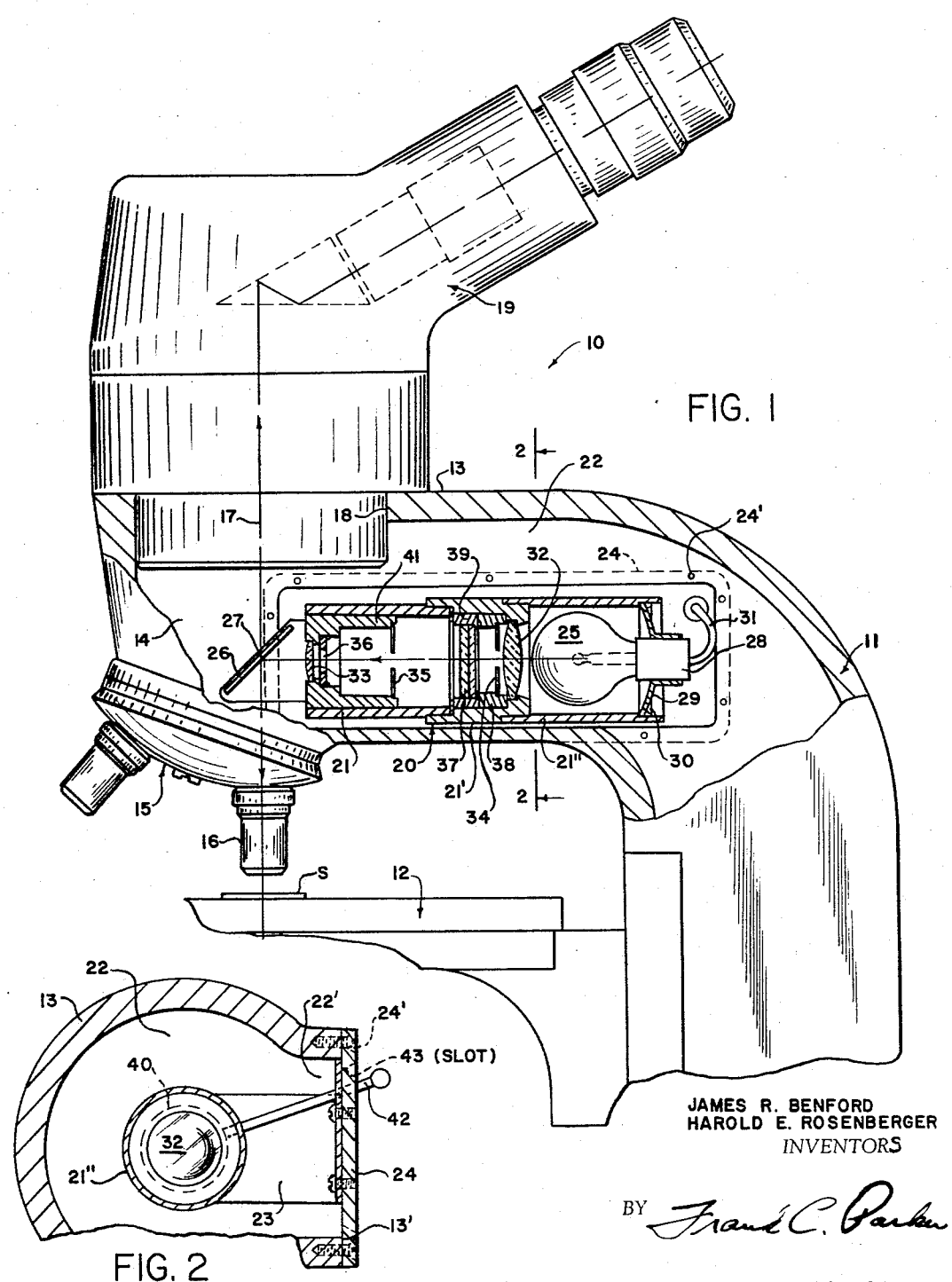

Jan. 10, 1967 J. R. BENFORD ET AL 3,297,391
UNITARY VERTICAL ILLUMINATION DEVICE FOR DETACHABLE
MOUNTING IN MICROSCOPE FRAME
Filed March 26, 1963

JAMES R. BENFORD
HAROLD E. ROSENBERGER
INVENTORS

BY Frank C. Parker

ATTORNEY

United States Patent Office 3,297,391
Patented Jan. 10, 1967

3,297,391
UNITARY VERTICAL ILLUMINATION DEVICE FOR DETACHABLE MOUNTING IN MICROSCOPE FRAME
James R. Benford, Irondequoit, and Harold E. Rosenberger, Brighton, N.Y., assignors to Bausch & Lomb Incorporated, Rochester, N.Y., a corporation of New York
Filed Mar. 26, 1963, Ser. No. 268,009
2 Claims. (Cl. 350—91)

The present invention relates to vertical illumination mechanism for microscopes and more particularly it relates to such illuminators which are constructed substantially entirely within a horizontal arm of the frame of the microscope.

In recent years efforts to improve microscopes have involved streamlining of the general lines of the instrument and elimination of protuberant members whereby maintenance and general appearance were improved along with the conditions of use.

In pursuance of this effort, inter alia, it is a purpose of this invention to provide a novel, complete, vertical illumination device for a microscope, said device being substantially entirely housed within a horizontal part of the frame of the microscope so that the device is safe from accidental damage and from meddlesome or unnecessary handling, said device further having a substantially dust-tight construction.

It is a further object to provide such a device which is sturdy and free from disturbing vibration, and is easily demountable as an operative unit for service purposes without disturbing the objective or nosepiece of the microscope or altering its optical tube length, the instrument retaining the same clean external appearance whether or not the illuminator is assembled therein.

Further objects and advantages will be apparent in the construction and combination of the constituent parts of the device by reference to the following specification and accompanying drawing in which:

FIG. 1 shows a side elevation of one form of the present invention, parts thereof being broken away and shown in section; and FIG. 2 is a sectional view taken on the line 2—2 of FIG. 1.

A microscope is shown at 10 having a microscope arm 11 which is fixed to a base, not shown. Along the front side of the arm 11 is movably mounted a stage 12 on which a specimen S is held. The upper part of said arm is formed with a horizontal portion 13 resembling an inverted L having a vertical opening 14 therethrough wherein is held in any suitable manner, not shown, a nosepiece 15. In the nosepiece is secured one or more objectives 16, one being positioned on the vertical axis 17 of the microscope and coaxially therewith is formed a vertical bore 18 through said horizontal portion 13 of said arm 11. Fitted demountably into the upper end of said bore 18 is a suitable eyepiece member 19 by which the image of the specimen S formed by the objective is viewed.

According to the present invention, a complete illuminating device generally indicated by numeral 20 is provided for episcopic illumination of said specimen S, the parts of the device being secured within a mounting tube 21 which is demountably fitted and held within a hollow chamber 22 formed in the horizontal portion 13 of the microscope arm. The tube 21 may be an integral tube or may consist of a plurality of tandem tubular parts 21, 21' and 21" as shown in FIG. 1 which are either firmly or swivelly jointed together to provide a rotatable section such as part 21'.

Support means are provided for the illuminator 20 including struts 23 or other connecting members which are connected to the parts of the tube 21 and are anchored on a cover plate 24 located on the exterior of the horizontal arm 13. The cover plate 24 is preferably flat and closes a side opening 22' extending laterally from the chamber 22 to the exterior of the arm 13, the opening 22' being so proportioned that the illuminator 20 may be removed therethrough. A plurality of screws 24' extending through fitted holes in the cover plate 24 and engaging in tapped holes in the arm 13 retains the cover plate against a flat side face 13' on the arm and also aligns the illuminator 20 in optically aligned position in the chamber 22.

In the form of the invention shown in FIG. 1, the illuminator 20 is supported solely by the cover 24 and constitutes an operative unit therewith but it is within the concept of this invention to utilize other supporting and/or alignment mechanisms together with the cover attachment.

All of the operating parts of the illuminator are contained in the mounting tube 21 or tube sections 21, 21' and 21" so that the device is complete per se for replacement and servicing purposes. By reference to the drawing it will be noticed that the form and arrangement of the parts of the tube 21 and horizontal arm 13 are so constructed that removal of the illuminating device does not destroy the good general appearance of the microscope since a separate closure plate, not shown, may be substituted for the cover plate 24 when the illuminator 20 is demounted from the arm 13.

Any preferred combination of optical members may be constructed within the mounting tube 21 to meet specified operating requirements for the episcopic illumination of the specimen, and basically such members include a lamp 25 for producing the light and a beam divider 26 positioned obliquely across the intersection point 27 where the horizontal axis of the tube 21 and the vertical axis 17 intersect so as to direct the illuminating beam downwardly through the objective 16 upon the specimen S. As schematically shown in the drawing, the lamp 25 has a base 28 which is suitably fixed centrally in a spherical reflector 29, the outer rim of which is demountably secured within the outer end of mounting tube 21 by any suitable means such as the ring shown at 30. Proper electrical leads 31 are connected in any preferred manner from the lamp base 28 to a power circuit for energizing the lamp.

As shown in the drawing, the light rays are preferably concentrated by condenser lenses 32 and 33 and projected upon the beam divider 26 from whence the rays are reflected through the objective 16 upon specimen S.

As far as the detailed structure and arrangement of the illuminating device 20 per se is concerned, any of the well known light beam modifying devices may be included therein as desired such as the diaphragms 34, 35 and 36, or tint plates, polarizers and filters 37. The aforesaid devices may be mounted in any operative manner in the mounting tube 21 or tube sections 21, 21' and 21" such as the successive mounting cells 38, 39 and 41 which may be either fixed in the tube or may be rotatably mounted therein as required. FIG. 2 shows a rotatable type of cell 40 such as a polarizer cell which may be rotated by a handle 42 anchored in the cell and extending through an elongated slot 43 formed in the cover plate 24 so that external operation of the polarizer is facilitated.

Proper alignment of the beam divider 26 at the axial intersection point 27, in the form of the invention shown in the drawings, is effected by means of the cover screws 24' which position the cover plate 24 together with the mounting tube 21 on the mounting surface 13' of the microscope arm 13 although the alignment means may be designed otherwise including alignment means for the tube 21 independent of the plate 24.

In demounting the illustrated complete illuminator 20, the cover 24 which closes the opening 22' is removed along with the complete illuminator fixed thereto. It is only necessary to remove the screws 24' to effect the disassembly. When the illuminator has been removed from the microscope, a dummy cover plate, not shown, may be substituted as aforesaid to cover the opening 22' and restore the good appearance of the instrument.

From the foregoing description it will be seen that the illuminator 20 is a completely operative device per se which may be equipped with variously selected light beam modifying devices which are individually adjusted for best effect before inserting the illuminator in the chamber 22.

Although only one form of the present invention has been shown and described in detail, other forms are possible and changes may be made in the form and arrangement of the parts without departing from the spirit of the invention as defined in the claims here appended.

We claim:

1. In a microscope having a first opening extending through the frame thereof between its objective and eyepiece and a second opening extending along said frame laterally from the first opening,
   - a self-contained episcopic illuminating device housed and positioned within said second opening so as to project light through the first opening and said objective upon a specimen, said device having in combination,
   - a mounting tube extending along said second opening,
   - a lamp and a reflector therefor mounted in the end of said tube most remote from the first opening,
   - a beam divider mounted on the other end of said tube obliquely across the first opening in alignment with said lamp and objective,
   - a plurality of light modifying devices including a light condenser located between said lamp and said beam divider in said tube for producing a specified kind of illumination,
   - a cover plate secured to the outer surface of that part of said frame which contains the second opening, said cover being substantially coextensive with said mounting tube and overlying and closing an elongated side opening which connects said second opening to said outer surface, and means for securing the tube to the frame including at least one strut which is fixed at one end to said plate and at the other end to said tube so as to provide the sole support for the tube whereby demountability of said device as a unit with the cover plate is secured.

2. A microscope illuminating device as set forth in claim 1 further characterized by said means for securing the tube to the frame including alignment means cooperatively formed on the frame and cover whereby the optical axis of the device is reliably aligned with the optical axis of said objective.

References Cited by the Examiner

UNITED STATES PATENTS

| | | | |
|---|---|---|---|
| 2,146,506 | 2/1939 | Maisch | 88—39 |
| 2,209,532 | 7/1940 | Michel | 88—39 |
| 2,910,913 | 11/1959 | Michel | 88—39 |
| 2,942,518 | 6/1960 | Brockway | 88—39 |
| 3,028,791 | 4/1962 | Clark et al. | 88—32 |
| 3,202,047 | 8/1965 | Lawler | 88—40 X |

FOREIGN PATENTS

| | | |
|---|---|---|
| 758,192 | 4/1954 | Germany. |
| 972,971 | 12/1959 | Germany. |

DAVID H. RUBIN, *Primary Examiner.*

J. G. BOLTEN, *Assistant Examiner.*